US007614134B2

(12) United States Patent
Messein et al.

(10) Patent No.: US 7,614,134 B2
(45) Date of Patent: Nov. 10, 2009

(54) METHOD OF OVERLOCKING AT LEAST ONE STRAND IN AN ANCHORING BLOCK AND SYSTEM FOR OVERLOCKING AT LEAST ONE STRAND IN AN ANCHORING BLOCK

(75) Inventors: Jean-Pierre Messein, Villers les Nancy (FR); Sébastien Diaz, Chalon sur Saone (FR)

(73) Assignee: Freyssinet (FR)

( * ) Notice: Subject to any disclaimer, the term of this patent is extended or adjusted under 35 U.S.C. 154(b) by 238 days.

(21) Appl. No.: 10/852,779

(22) Filed: May 25, 2004

(65) Prior Publication Data

US 2005/0005570 A1 Jan. 13, 2005

(30) Foreign Application Priority Data

May 26, 2003 (FR) .................................. 03 06319

(51) Int. Cl.
*B23P 19/02* (2006.01)
*B25C 1/08* (2006.01)

(52) U.S. Cl. ........................ 29/525; 29/525.01; 29/432; 29/452; 227/9; 227/10; 173/90

(58) Field of Classification Search .................. 29/525, 29/525.01, 432, 452; 227/9, 10, 8, 11; 173/90; 52/223.13
See application file for complete search history.

(56) References Cited

U.S. PATENT DOCUMENTS 2,412,511 A 12/1946 Jones et al.
2,834,081 A * 5/1958 Stump, Jr. .................. 403/369
3,112,487 A * 12/1963 Hilti ............................ 227/10
3,129,429 A * 4/1964 Hilti ............................ 227/10
3,181,760 A * 5/1965 Catlin et al. .................. 227/10
3,632,032 A * 1/1972 Termet ........................ 227/10
3,645,091 A * 2/1972 Ivanov et al. ................. 60/638
3,658,229 A * 4/1972 Pomeroy ..................... 227/10
3,690,536 A * 9/1972 Bakoledis .................... 227/10
3,742,591 A * 7/1973 Ritter et al. ................... 29/525
3,762,027 A * 10/1973 Burtelson .................... 29/452
3,771,709 A * 11/1973 Breschinsky ................ 227/120
3,895,752 A * 7/1975 Hatayama et al. ............ 227/10
3,991,925 A 11/1976 Buchel
4,362,421 A * 12/1982 Kelly ......................... 403/369
4,604,003 A * 8/1986 Francoeur et al. ........... 405/256

(Continued)

FOREIGN PATENT DOCUMENTS

CN 2316367 4/1999

OTHER PUBLICATIONS

French Search Report dated Jan. 26, 2004.

*Primary Examiner*—Essama Omgba
(74) *Attorney, Agent, or Firm*—Banner & Witcoff, Ltd.

(57) ABSTRACT

Method of overlocking at least one strand in an anchoring block by means of a frustoconical jaw which surrounds the strand and which is housed in a frustoconical recess made in the block, the process comprising the following steps: an explosive cartridge device comprising an inertia block intended to be propelled by the explosion of the cartridge is used, a force transmission device is arranged between the inertia block of the explosive cartridge device and the frusto-conical jaw, and the explosive cartridge is activated to propel the inertia block against the force transmission device.

22 Claims, 2 Drawing Sheets

U.S. PATENT DOCUMENTS

| | | | | | |
|---|---|---|---|---|---|
| 5,170,922 | A | * | 12/1992 | Ehmig et al. | 227/8 |
| 5,332,140 | A | * | 7/1994 | Almeras et al. | 227/9 |
| 5,767,434 | A | * | 6/1998 | Hirtl et al. | 89/1.14 |
| 6,053,388 | A | * | 4/2000 | Pfister et al. | 227/10 |
| 6,059,162 | A | * | 5/2000 | Popovich et al. | 227/10 |
| 6,085,958 | A | * | 7/2000 | Kersten | 227/10 |
| 6,126,055 | A | * | 10/2000 | Gantner et al. | 227/10 |
| 6,321,968 | B1 | * | 11/2001 | Remerowski | 227/10 |
| 6,513,287 | B1 | * | 2/2003 | Sorkin | 52/223.13 |
| 6,543,665 | B1 | * | 4/2003 | Farrell et al. | 227/10 |
| 2008/0302035 | A1 | * | 12/2008 | Shin | 52/223.13 |

* cited by examiner

METHOD OF OVERLOCKING AT LEAST ONE STRAND IN AN ANCHORING BLOCK AND SYSTEM FOR OVERLOCKING AT LEAST ONE STRAND IN AN ANCHORING BLOCK

CROSS REFERENCE TO RELATED APPLICATIONS

This application claims priority to France Patent Application Serial No. FR 03 06319, filed May 26, 2003, which is incorporated herein by reference in its entirety.

FIELD OF THE INVENTION

The present invention relates to a method of overlocking at least one strand in an anchoring block and to a system or apparatus for overlocking at least one strand in an anchoring block.

More particularly, the subject of the invention is a method of overlocking at least one strand in an anchoring block by radially clamping the strand with a frustoconical jaw that surrounds the strand and is housed in a frustoconical recess of complementary shape formed in the anchoring block.

BACKGROUND OF THE INVENTION

As generally known, a stay strand comprises a wire or a plurality of twisted wires intended to be tensioned for the purpose, in particular, of prestressing a body made of concrete or for suspending a civil engineering structure such as a bridge.

To accomplish tensioning, the stay strand is first locked or clamped in an anchoring block by means of a jaw or jaws fitted into the block to grip the strand by friction or traction with the strand and at least partly by application of an axial thrust or force against a large base of the jaw. Such axial thrust effects a radial clamping force on the strand effected typically by a frustoconical or cone jaw configuration fitted into a compatible opening in the anchor block. In order to guarantee that the strand does not slip in relation to the jaw surrounding it, a securing operation, called overlocking, guarantees that the jaw will be held around the strand during the lifetime of the civil engineering structure on which the said strand is tensioned.

This overlocking operation is currently carried out by means of hammer blows applied directly to the large base of the jaw in order to displace it by a few millimetres axially within its housing or anchoring block so as to guarantee radial prestressing force on the strand. Nevertheless, this overlocking operation, carried out by an operator using a hammer to strike blows on the jaw, does not guarantee with certainty that the displacement of the anchoring jaw within its housing or anchoring block has been sufficient for the jaw to find a so-called final position, that is to say a position that the jaw is intended to find during the maximum loading tolerated by the stay strand.

Moreover, a securing operation by means of hammer blows is not generally suitable when the anchoring jaw is difficult to access, in particular in cramped civil engineering structures.

SUMMARY OF THE INVENTION

An aim or object of the present invention is to improve prior overlocking methods so that the operator can be sure that the anchoring jaw has reached its overlocking or preferred locking position in the anchor block. To this end, according to the invention, a method of overlocking comprises the following steps:

- an explosive cartridge device including an inertia block that is to be propelled by the explosion of a cartridge is provided;
- a force transmission device is arranged between the inertia block of the explosive cartridge device and a frustoconical jaw; and
- an explosive cartridge is activated to propel the inertia block against the force transmission device, which, in turn, pushes against the frustoconical jaw to drive it into the frustoconical recess in the anchoring block, thereby causing the stay strand to be overlocked by radial clamping of the frustoconical jaw.

In preferred embodiments of this method, according to the invention it is possible, where appropriate, additionally to have recourse to one or the other or both of the following steps:

- a high-pressure gas cartridge device may be used to drive the inertia block;
- use is made of a force transmission device which comprises:
- a body defining an inner chamber which extends between a first orifice or opening connected to an end-piece of the explosive cartridge device, from which the inertia block is propelled, and a second orifice or opening; and
- a percussion member which comprises a first portion at one end which is housed in the inner chamber of the body and which has a larger diameter than the second orifice or opening, the said first portion being intended to be struck by the inertia block, and a second portion at the other end connected to or integral with the first portion and mounted such that it can slide in the second orifice, the said second portion having a free end intended to interact or engage with the frustoconical jaw by impacting thereon; and
- a compression spring is interposed between the first portion of the percussion member and the inner chamber of the body.

Moreover, another object of the invention is to provide a system for overlocking at least one strand in an anchoring block by radially clamping the strand with a generally frustoconical shape jaw which generally surrounds the strand and which is housed or positioned in a frustoconical recess of complementary shape in the block, characterized in that it comprises:

- an explosive cartridge device comprising an inertia block intended to be propelled by the explosion of the cartridge; and
- a force transmission device intended to interact with the inertia block of the explosive cartridge device to allow, upon the explosion of the explosive cartridge, the inertia block to be propelled against the force transmission device, which in turn pushes against the frustoconical jaw to drive it into the frustoconical recess in the anchoring block, thereby causing the strand to be overlocked by radial clamping of the frustoconical jaw.

In a preferred embodiment of the overlocking system, according to the invention it is possible, where appropriate, additionally to have recourse to one or the other or both of the following arrangements:

- the force transmission device comprising:
- a body defining an inner chamber which extends between a first orifice or opening connected to an end-piece of the explosive cartridge device, from which the inertia block is propelled, and a second orifice or opening, and a percussion member which comprises, on the one hand, a first portion which is housed in the inner chamber of the body and which has a larger diameter than the second orifice or opening in the body, the first portion being intended to be struck by the inertia block, and, at the other end, a second portion integral with the first portion and mounted such that it can slide in the second orifice, the said second portion having a free end intended to interact with the frustoconical jaw;

a compression spring is interposed between the first portion of the percussion member and the inner chamber of the body; and the body of the force transmission device is formed by a first casing which comprises the first orifice and by a second casing which is integral with the said first casing and comprises the second orifice.

BRIEF DESCRIPTION OF THE DRAWINGS

Other features and advantages of the invention will emerge in the course of the description below of one of its embodiments, which is given by way of non-limiting example, with reference to the appended drawings.

In the drawings.

DETAILED DESCRIPTION

In the various figures, the same references denote like or similar elements.

Figure 1:
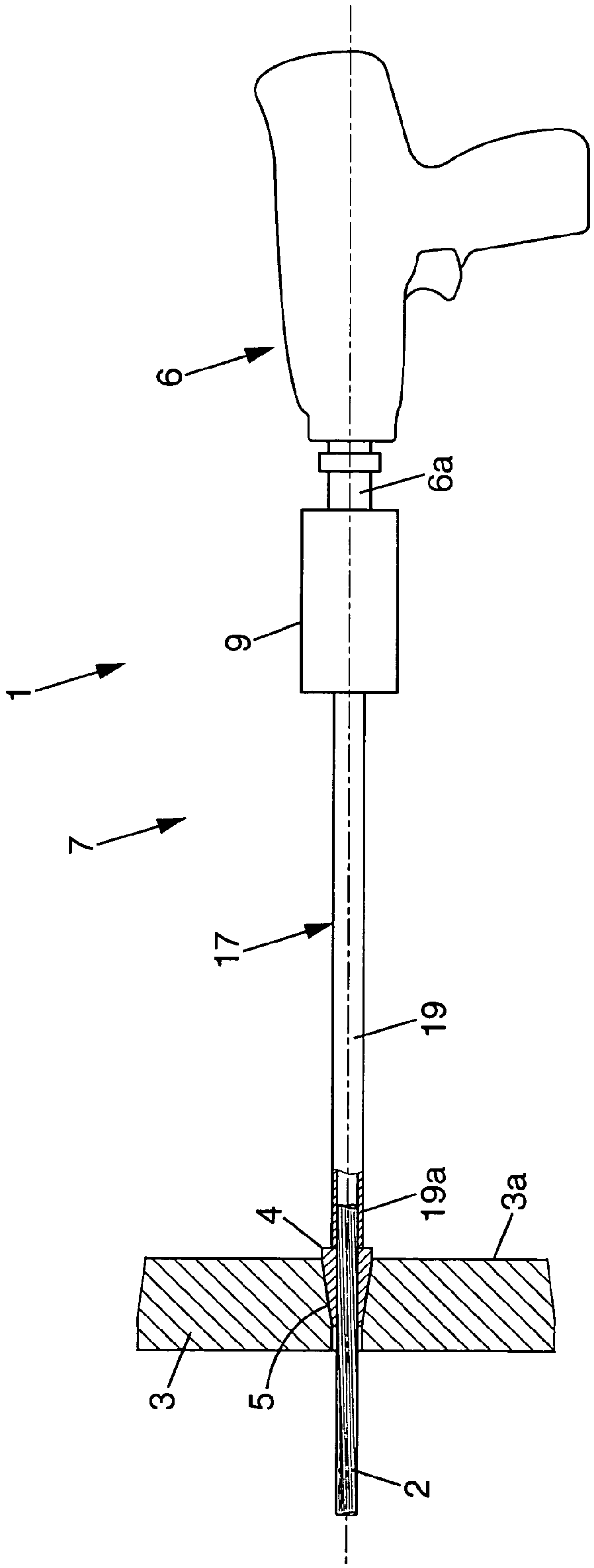
FIG. 1 is a view in partial section of the overlocking system according to the invention when it is used for overlocking a jaw which surrounds a strand in an anchoring block.

FIG. 1 depicts an overlocking mechanism or device and system 1 designed to overlock at least one stay strand 2 in an anchoring block 3 by radially clamping the strand 2 by means of an anchoring jaw 4 which generally surrounds the strand 2 and which is housed in a frustoconical recess 5 formed in the anchoring block 3. The strand 2 may be composed of a single wire or of a plurality of twisted wires.

Figure 2:
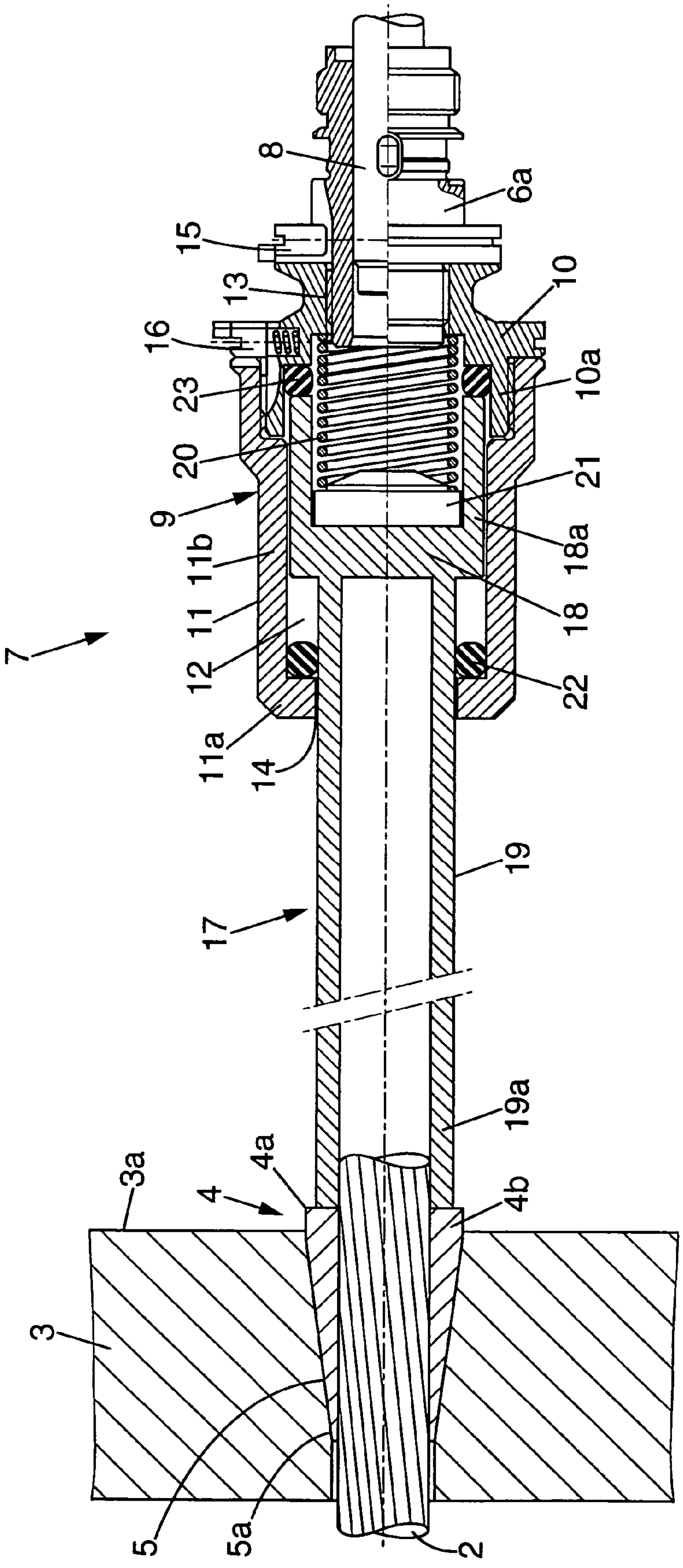
FIG. 2 is an enlarged view in section of the force transmission device of the overlocking system according to the invention.

As can be seen in more detail in FIG. 2, the anchoring jaw 4 may be formed by a split anchoring jaw or by a plurality of wedges 4*a*, 4*b*, for example two, having a substantially semi-cylindrical and frustoconical shape.

The narrowest portion of the frustoconical jaw 4, formed by the wedges 4*a*, 4*b*, is housed in the narrow end 5*a* of the frustoconical recess 5 made in the anchoring block 3 which the strand 2 passes right through. The larger end of the anchoring jaw 4 projects axially from the face 3*a* of the anchoring block 3. The free end of the strand 2 likewise extends beyond the widest portion of the anchoring jaw 4.

Radial clamping of the strand 2 by the anchoring jaw 4 is provided by a wedging action by causing this anchoring jaw 4, and therefore the wedges 4*a*, 4*b*, to be driven axially into the frustoconical recess 5. During the installation of the anchoring jaw 4 in the frustoconical recess 5 of the anchoring block 3, axial stress may be generated by the actual tension of the strand 2 on account of the friction which exists between this strand 2 and the internal face of the anchoring jaw 4, or else by axially driving this anchoring jaw 4 into the recess 5 in block 3 while the tension of the strand 2 is minimal.

In order to ensure that the strand 2 will not slip from the anchoring block 3, a securing operation, referred to as an overlocking operation, ensures that the anchoring jaw 4, and therefore the wedges 4*a*, 4*b*, will hold over the lifetime of the civil engineering structure. Overlocking ensures imposition of radial prestress on the strand 2 by driving the anchoring jaw 4 into block 3, this prestress on the strand 2 substantially corresponding to the final position of the wedges 4*a*, 4*b*, that is the position that they would assume during the maximum loading to be tolerated by the strand 2.

To this end, the overlocking system according to the invention comprises, as can be seen in FIG. 1, an explosive cartridge device 6 and also a force transmission device 7 directly arranged between the explosive cartridge device 6 and the anchoring jaw 4 that has previously been driven or positioned into the frustoconical recess 5 in the anchoring block 3 before overlocking.

The explosive cartridge device 6 may, for example, be formed by a gas discharge mechanism or an automatic gun with an automatically or manually replaceable explosive cartridge, and which comprises (FIG. 2) an inertia block 8 intended to be propelled upon the explosion of the explosive cartridge. By way of example, this explosive cartridge device 6 may be formed by an automatic cartridge gun marketed by the company HILTI, in particular under the model number DXA 40.

For its part, the force transmission device 7 is intended to interact with the inertia block 8 of the explosive cartridge device 6 to allow, upon explosion of an explosive cartridge, the inertia block 8 to be propelled against the force transmission device 7, which, in turn, pushes against the frustoconical jaw 4 in order to drive it into an overlocking position in the frustoconical recess 5 in the anchoring block 3.

To this end, this force transmission device 7 comprises a generally cylindrical body 9 formed by a first casing 10 and a second casing 11 which define between them an inner chamber 12. This inner chamber 12 of the body 9 extends between a first orifice or circular passage 13 made directly in the first casing 10 and a second orifice or circular passage 14 made directly in the second casing 11. The first orifice 13 is directly connected to an end-piece 6*a* in which the inertia block 8 of the explosive cartridge device 6 is housed in a sliding manner. This end-piece 6*a* may form a constituent element of the explosive cartridge device 6 or else form a constituent element of the force transmission device 7. End-piece 6*a* is directly mounted in a fixed manner in the orifice 13 in the first casing 10, for example, by means of a pin 15 which passes right through the casing 10 to interact with the end-piece 6*a* so as to secure them to one another.

As can be seen in FIG. 2, the second casing 11 has an end wall 11*a* in which the opening or orifice 14 is made, and from which extends an annular wall 11*b* intended to interact with an annular wall 10*a* of the first casing 10 to form the inner chamber 12. The first casing 10 and the second casing 11 are joined or fixed relative to one another by suitable means and in particular, for example, by screwing and/or by means of a pin 16.

The force transmission device 7 also comprises a percussion member 17 which is substantially in the form of an elongate shaft which comprises, on the one hand or at one end, a first portion or piston element 18 which is housed in the inner chamber 12 of the body 9 and which has a greater diameter than the second orifice 14 of the casing 11, and, on the other hand or end, a hollow second cylindrical portion 19 which is integral with the first portion 18 and which is mounted such that it can slide in the second orifice 14 in the casing 11. This second cylindrical portion 19 has a free end 19*a* intended to bear against the widest part of the wedges 4*a*, 4*b* forming the anchoring jaw 4 while surrounding the end of the strand 2 which projects beyond the said wedges 4*a*, 4*b*. The first portion 18 of the percussion member 17 also comprises a cylindrical annular wall 18*a* which extends in the direction of the casing 10 and which surrounds a compression spring 20 directly interposed between the casing 10 and the first portion 18 of the percussion member 17. The first portion 18 of the percussion member 17 also comprises a centering piece or element 21 for the spring 20 which is arranged facing the inertia block 8. Moreover, shock-absorbing elements such as O-rings 22, 23 are arranged on either side of the inner chamber 12 of the body 9 so as to absorb the displacement of the first portion 18 of the percussion member 17 inside the body 9.

When an operator wishes to overlock the anchoring jaw 4 in the frustoconical recess 5 in the anchoring block 3 after having previously placed and driven the said anchoring jaw 4 into the frustoconical recess 5, the operator first of all positions the overlocking system such that the free end 19*a* of the percussion member 17 comes into contact with the wedges 4*a*, 4*b* while surrounding the strand 2. This placing of the overlocking system 1 on the anchoring jaw 4 has the effect of bringing the annular wall 18*a* of the first portion 18 of the percussion member 17 into abutment with the shock-absorbing element 23, doing so against the loading exerted by the compression spring 20.

All the operator then has to do is activate the explosive cartridge device 6 by triggering the explosion of the said cartridge, which may be an explosive cartridge releasing a high-pressure gas after the explosion has been triggered, in order to propel the inertia block 8 against the centering piece 21 of the first portion 18 of the percussion member 17. This percussion member 17 then automatically transmits the impact produced by the inertia block 8 to the wedges 4*a*, 4*b* of the anchoring jaw 4 so as to bring it into an overlocking position which corresponds to a position that the anchoring jaw 4 would have adopted during the maximum loading tolerated by the strand 2, thereby ensuring that the strand 2 is radially prestressed.

This overlocking operation therefore makes it possible to dissociate the holding of the strand 2 in the anchoring and the tension of the strand 2, which may prove to be advantageous in the event of the tension of the strand 2 becoming greatly diminished or even cancelled during the actual service of the strand 2, such a situation possibly arising, for example, when an impact is received by a suspension bridge strand, where the impact may, for example, be caused by an earth tremor, by a tornado or by a heavy goods vehicle losing control.

Moreover, the choice of explosive cartridge and percussion member 17 makes it possible to adapt and choose the calibrated force transmitted to the anchoring jaw 4 in order to fix it in its so-called overlocking position. Moreover, the dimensions of the inertia block and of the percussion member 17 may be chosen so as to prevent them from buckling or deforming.

While there has been set forth a preferred embodiment of the invention, ti is to be understood that the invention is to be limited only by the following claims and equivalents thereof. The mechanism for driving the jaws 4 may, for example, be altered without departing from the spirit and scope of the invention. Such mechanism may include other means for transmitting force to the percussion member 18. Pressurized gas or mechanical means may be used. Note the disclosed design facilitates recoil action and includes elements such as cushions (or rings) 22, 23 in this regard. In any event, utilization of a source of pressure on a driving member by gas, cartridge firing or otherwise to effect overlocking of the jaws on a stay strand in a block enables application of controlled force to effect such overlocking.

What is claimed is:

1. A method of overlocking at least one strand in an anchoring block by radially clamping the strand by a frustoconical jaw which surrounds said strand and which is housed in a frustoconical recess of complementary shape made in the block, said method comprising the following steps:

providing an explosive cartridge device comprising an inertia block intended to be propelled by the explosion of a cartridge;

arranging a separate force transmission device between the inertia block of the explosive cartridge device and a frustoconical jaw, and activating the explosive cartridge to propel the inertia block against the force transmission device, to, in turn, push against the frustoconical jaw to drive said jaw onto said strand into a frustoconical recess so as to go into the anchoring block while no pressure is exerted directly onto the strand, and thereby provide radial stress on the strand to overlock the strand by radial clamping of the frustoconical jaw.

2. The method according to claim 1 wherein said explosive cartridge device is capable of releasing a high-pressure gas.

3. The method according to claim 1 wherein said force transmission device includes:

a body defining an inner chamber which extends between a first orifice connected to an end-piece of the explosive cartridge device, from which the inertia block is propelled, and a second orifice, and a percussion member which comprises, on the one hand, a first portion which is housed in the inner chamber of the body and which has a larger diameter than the second orifice, the said first portion being intended to be struck by the inertia block, and, on the other hand, a second portion integral with the first portion and mounted in a sliding manner in the second orifice, the said second portion having a free end to interact with the frustoconical jaw.

4. The method according to claim 3 further including a compression spring interposed between the first portion of the percussion member and the inner chamber of the body.

5. A system for overlocking at least one strand in an anchoring block by radially clamping the strand by a frustoconical jaw which surrounds the said strand and which is housed in a frustoconical recess of complementary shape made in the block, said system comprising:

an explosive cartridge device comprising an inertia block intended to be propelled by the explosion of the cartridge, a separate force transmission device intended to interact with the inertia block of the explosive cartridge device to allow, upon the explosion of the explosive cartridge, the inertia block to be propelled against the said force transmission device, which in turn pushes against a frustoconical jaw to drive it along the strand into a frustoconical recess in an anchoring block, thereby causing radial stress on the strand to overlock the strand by radial clamping of the frustoconical jaw while no pressure is exerted directly onto the strand.

6. The system according to claim 5, in which the force transmission device comprises:

a body defining an inner chamber which extends between a first orifice connected to an end-piece of the explosive cartridge device, from which the inertia block is propelled, and a second orifice, and a percussion member which comprises, on the one hand, a first portion which is housed in the inner chamber of the body and which has a larger diameter than the second orifice, the said first portion being intended to be struck by the inertia block, and, on the other hand, a second portion integral with the first portion and mounted in a sliding manner in the second orifice, the said second portion having a free end intended to interact with the frustoconical jaw.

7. The system according to claim 6, in which a compression spring is interposed between the first portion of the percussion member and the inner chamber of the body.

8. The system according to claim 6, in which the body of the force transmission device is formed by a first casing which comprises the first orifice and by a second casing which is integral with the said first casing and comprises the second orifice.

9. A method for overlocking at least one strand in an anchoring block by radially clamping the strand with a jaw which surrounds the said strand at least in part and which is housed in a recess of complementary shape made in the block, said method comprising the steps of:

(a) positioning a force transmission device on a jaw, and (b) driving a separate inertia block member against the force transmission device by propelling the block member against the force transmission device, which in turn pushes against the jaw to drive said jaw onto said strand and into the recess in an anchoring block, thereby to provide radial stress on the strand causing the strand to be overlocked by radial clamping of the jaw while no pressure is exerted directly onto the strand.

10. The method of claim 9, wherein the driving step is provided by an explosive device releasing a high-pressure gas against the inertia block member.

11. The method of claim 9, wherein said force transmission device comprises:

a body defining an inner chamber which extends between a first opening receiving the inertia block member, and a second opening receiving the force transmission device.

12. The method of claim 11 further including a percussion member housed in the chamber of the body and which has a larger diameter than the second opening, said percussion member positioned to be struck by the inertia block member.

13. The method of claim 12, including a compression spring interposed between the percussion member and the inner chamber of the body.

14. A mechanism for overlocking at least one strand in an anchoring block by radially clamping the strand by a jaw which surrounds at least in part the said strand and which is housed in a recess of complementary shape in the block, said mechanism comprising, in combination:

a jaw surrounding at least in part a strand;

an inertia block member movable in response to a gas pressure;

a housing forming a chamber for receipt of the inertia block member; and a separate force transmission device movable in the chamber in response to engagement by the inertia block member propelled against the said force transmission device, which in turn pushes against the jaw to drive it along the strand and into the recess in the anchoring block, thereby to provide a radial stress on the strand causing the strand to be overlocked by radial clamping of the jaw while no pressure is exerted directly onto the strand.

15. A mechanism according to claim 14, in which the force transmission device comprises:

a body defining an inner chamber which extends between a first opening for receiving the inertia block member, and a second opening, and a percussion member in the second opening which extends into the inner chamber of the body and which has a larger diameter in the inner chamber than the second opening, the said percussion member positioned to be struck by the inertia block member, and mounted in a sliding manner in the second opening, said percussion member having a free end intended to interact with the jaw.

16. A mechanism according to claim 15, including a compression spring interposed between the percussion member and the inner chamber of the body.

17. A mechanism according to claim 15, in which the body is formed by a first casing which includes the first opening and by a second casing which is integral with the said first casing and includes the second opening, said first and second casings being connected to define a chamber.

18. A method of overlocking at least one strand in an anchoring block by radially clamping the strand by a frustoconical jaw which surrounds said strand and which is housed in a frustoconical recess of complementary shape made in the block, said method comprising the following steps:

providing an explosive cartridge device comprising an inertia block intended to be propelled by the explosion of a cartridge;

arranging a separate force transmission device between the inertia block of the explosive cartridge device and a frustoconical jaw, said force transmission device including a body defining an inner chamber which extends between a first orifice connected to an end-piece of the explosive cartridge device, from which the inertia block is propelled, and a second orifice, and a percussion member which comprises, on the one hand, a first portion which is housed in the inner chamber of the body and which has a larger diameter than the second orifice, the said first portion being intended to be struck by the inertia block, and, on the other hand, a second portion integral with the first portion and mounted in a sliding manner in the second orifice, the said second portion having a free end to interact with the frustoconical jaw; and activating the explosive cartridge to propel the inertia block against the force transmission device, to, in turn push against the frustoconical jaw to drive said jaw into a frustoconical recess in the anchoring block, and thereby overlock the strand by radial clamping of the frustoconical jaw.

19. A system for overlocking at least one strand in an anchoring block by radially clamping the strand by a frustoconical jaw which surrounds the said strand and which is housed in a frustoconical recess of complementary shape made in the block, said system comprising:

an explosive cartridge device comprising an inertia block intended to be propelled by the explosion of the cartridge, and a separate force transmission device intended to interact with the inertia block of the explosive cartridge device to allow, upon the explosion of the explosive cartridge, the inertia block to be propelled against the said force transmission device, which in turn pushes against a frustoconical jaw to drive it into a frustoconical recess in an anchoring block, thereby causing the strand to be overlocked by radial clamping of the frustoconical jaw, said force transmission device comprising:

a body defining an inner chamber which extends between a first orifice connected to an end-piece of the explosive cartridge device, from which the inertia block is propelled, and a second orifice, and a percussion member which comprises, on the one hand, a first portion which is housed in the inner chamber of the body and which has a larger diameter than the second orifice, the said first portion being intended to be struck by the inertia block, and, on the other hand, a second portion integral with the first portion and mounted in a sliding manner in the second orifice, the said second portion having a free end intended to interact with the frustoconical jaw.

20. A mechanism for overlocking at least one strand in an anchoring block by radially clamping the strand by a jaw which surrounds at least in part the said strand and which is housed in a recess of complementary shape in the block, said mechanism comprising, in combination:

an inertia block member movable in response to a gas pressure;

a housing forming a chamber for receipt of the inertia block member; and a separate force transmission device movable in the chamber in response to engagement by the inertia block member propelled against the said force transmission device, which in turn pushes against a jaw to drive it into the recess in the anchoring block, thereby causing the strand to be overlocked by radial clamping of the jaw, said force transmission device comprising:

a body defining an inner chamber which extends between a first opening for receiving the inertia block member, and a second opening, and a percussion member in the second opening which extends into the inner chamber of the body and which has a larger diameter in the inner chamber than the second opening, the said percussion member positioned to be struck by the inertia block member, and mounted in a sliding manner in the second opening, said percussion member having a free end intended to interact with the jaw.

21. A method of overlocking at least one strand in an anchoring block by radially clamping the strand by a frustoconical jaw which surrounds said strand and which is housed in a frustoconical recess of complementary shape made in the block, said method comprising the following steps:

providing an explosive cartridge device comprising an inertia block intended to be propelled by the explosion of a cartridge;

arranging a separate force transmission device between the inertia block of the explosive cartridge device and a frustoconical jaw, said inertia block and force transmission device being substantially aligned; and activating the explosive cartridge to propel the inertia block against the force transmission device, to, in turn push against the frustoconical jaw to drive said jaw onto said strand into a frustoconical recess so as to go into the anchoring block while no pressure is exerted directly onto the strand, and thereby provide radial stress on the strand to overlock the strand by radial clamping of the frustoconical jaw.

22. A system for overlocking at least one strand in an anchoring block by radially clamping the strand by a frustoconical jaw which surrounds the said strand and which is housed in a frustoconical recess of complementary shape made in the block, said system comprising:

an explosive cartridge device comprising an inertia block intended to be propelled by the explosion of the cartridge;

a separate force transmission device substantially aligned with the inertia block and intended to interact with the inertia block of the explosive cartridge device to allow, upon the explosion of the explosive cartridge, the inertia block to be propelled against the said force transmission, device, which in turn pushes against a frustoconical jaw to drive it along the strand into a frustoconical recess in an anchoring block, thereby causing radial stress on the strand to overlock the strand by radial clamping of the frustoconical jaw while no pressure is exerted directly onto the strand.

* * * * *

UNITED STATES PATENT AND TRADEMARK OFFICE

CERTIFICATE OF CORRECTION

PATENT NO. : 7,614,134 B2
APPLICATION NO. : 10/852779
DATED : November 10, 2009
INVENTOR(S) : Messein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 354 days.

Signed and Sealed this

Fourteenth Day of December, 2010

David J. Kappos

*Director of the United States Patent and Trademark Office*